United States Patent
Nair et al.

(10) Patent No.: US 10,057,253 B2
(45) Date of Patent: *Aug. 21, 2018

(54) CLOAKED DATA SYSTEM

(71) Applicant: American Express Travel Related Services Company, Inc., New York, NY (US)

(72) Inventors: Ashok K Nair, Phoenix, AZ (US); Sastry Durvasula, Phoenix, AZ (US); Kevin L Murray, Scottsdale, AZ (US); Sulabh Shukla, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,747

(22) Filed: Feb. 15, 2018

(65) Prior Publication Data

US 2018/0191705 A1 Jul. 5, 2018

Related U.S. Application Data

(63) Continuation of application No. 14/968,323, filed on Dec. 14, 2015, now Pat. No. 9,948,637.

(60) Provisional application No. 62/239,011, filed on Oct. 8, 2015.

(51) Int. Cl.
*H04L 29/00* (2006.01)
*H04L 29/06* (2006.01)
*G06F 21/31* (2013.01)
*G06F 21/62* (2013.01)

(52) U.S. Cl.
CPC ............ *H04L 63/083* (2013.01); *G06F 21/31* (2013.01); *G06F 21/6218* (2013.01); *H04L 63/06* (2013.01); *H04L 63/102* (2013.01); *H04L 63/0428* (2013.01)

(58) Field of Classification Search
CPC .... G06F 21/6218; G06F 21/14; G06F 21/105; G06F 21/602; G06F 21/31
See application file for complete search history.

(56) References Cited

U.S. PATENT DOCUMENTS

| 2004/0028227 A1 | 2/2004 | Yu |
| 2009/0113110 A1 | 4/2009 | Chen |
| 2015/0026462 A1 | 1/2015 | Ramesh et al. |

OTHER PUBLICATIONS

USPTO; Non-Final Office Action dated Sep. 5, 2017 in U.S. Appl. No. 14/968,323.
USPTO; Notice of Allowance dated Nov. 20, 2017 in U.S. Appl. No. 14/968,323.

*Primary Examiner* — Ghazal B Shehni
(74) *Attorney, Agent, or Firm* — Snell & Wilmer, L.L.P.

(57) ABSTRACT

Systems and methods of securely storing and retrieving data are disclosed. A database may include a table of data with rows and columns and encrypted at rest. The data may be desired to be accessed by users. However, each user may have different access permissions and each row or column may have different characteristics, such as encryption, data type, and/or the like. As such, access to the data may be controlled in according to the characteristics of the data, the access permissions of the user, and/or the encryption of the data.

20 Claims, 5 Drawing Sheets

CLOAKED DATA SYSTEM

CROSS-REFERENCE TO RELATED APPLICATIONS

This application is a Continuation of, claims priority to and the benefit of, U.S. Ser. No. 14/968,323, filed Dec. 14, 2015 and entitled "SYSTEM AND METHOD FOR DATA SECURITY ON BIG DATA SETS". The '323 application claims priority to U.S. Provisional Patent Application Ser. No. 62/239,011, filed on Oct. 8, 2015 and entitled "SYSTEM AND METHOD FOR DATA SECURITY ON BIG DATA SETS." Both of which are incorporated herein by reference in there entirety for all purposes.

FIELD

The present disclosure relates to data security for big data sets.

BACKGROUND

Large data sets may exist in various levels of size and organization. With big data comprising data sets as large as ever, the volume of data collected incident to the increased popularity of online and electronic transactions continues to grow. Billions of rows and hundreds of thousands of columns worth of data may populate a single table, for example. Different users may desire to access different portions of the large volume of data populating the table. However, different portions of the table may have different security restrictions, for instance, some portions may contain personally identifiable information that should have higher security. Moreover, various portions of the table and/or the entire table may be encrypted at rest. Different users may have different permissions specific to their roles, identities, and the row and/or column of the table desired to be accessed. However, the size and varied structure of big data sets is typically incompatible with traditional data protection techniques.

SUMMARY

In accordance with various embodiments, a cloaked data system is disclosed. The cloaked data system may include a cloak database having a table of data and metadata having a schema of the table of data. The cloaked data system may include a cluster edge node comprising a Hadoop framework configured to receive a user request from a user, such that the user may access a portion of the data. The system may also include a Hadoop cluster node in logical communication with the cluster edge node via an encrypted data request pathway and in logical communication with the cloak database and configured to selectively decrypt a portion of the table of data in response to the user request. The system may also include a cloak key database having at least one encryption key corresponding to the table of data. The schema may include a number of columns of a table, a data type of the data, and a user role associated with at least one of a row, column, and cell of the table. The cloaked data system may further include a key management server configured to store and retrieve encryption keys from the cloak key database, in response to a request of the Hadoop cluster node.

The cluster edge node may include a cloak client configured to, in response to the user request received from the Hadoop framework via a read request pathway, transmit at least one of a read or write request of the portion of the data from the cloak database and a cloak authentication data generator configured to generate encrypted authentication information corresponding to a user identity of the user and a role of the user.

The Hadoop cluster node may include a cloak cryptography service such that the portion of the data may be selectively retrieved and decrypted according to a decryption key, a user identity, and a user role.

The cloak cryptography service may include a cloak request handler configured to receive a request from a cloak client of a cluster edge node via a requestor authentication pathway to read or write data to the cloak database and/or the cloak key database. The service may also include a cloak authenticator configured to receive encrypted authentication data from a cloak request handler via the requestor authentication pathway such that the user identity and the user role may be determined in response to the encrypted authentication data. The service may also include a cloak reader configured to receive a read request from the cloak client of the cluster edge node via a cloak read request pathway. The cloak cryptography service may also include a cloak authorizer in logical communication with the cloak request handler via a requestor authorization pathway and configured to determine whether the user is authorized for the read request. In various embodiments, the cloak reader is in logical communication with a cloak key manager of a key management server via a decryption key request pathway such that the cloak reader obtains a key to decrypt the at least a portion of the data of the table.

A cloak storage format data retrieval method is also disclosed. The method may include receiving, by a Hadoop cluster edge node, a request from a user via a Hadoop framework, directing, by the Hadoop framework, a cloak client to read encrypted data stored in a cloak database in response to the request, calling, by the cloak client, a cloak authentication data generator to generate encrypted user authentication information whereby the user may be identified, and routing, a read request identifying the data to be read and containing the encrypted user authentication information from the cloak client of the Hadoop cluster edge node to a cloak request handler configured to obtain the data to be read. The method may also include running, by a cloak cryptography service, a cloak service request handler process configured to decrypt the data to be read, and responding, by the cloak cryptography service, with the decrypted data, to the cloak client of the Hadoop cluster edge node. In various embodiments, the cloak request handler includes a component of a cloak cryptography service running under supervision of a cloak cryptography service monitoring process in a Hadoop cluster node.

In various embodiments, the cloak storage format data retrieval method further includes evaluating by the cloak client the response for errors. In various embodiments, the cloak storage format data retrieval method further includes delivering, in response to errors not being found, unencrypted data by the Hadoop cluster edge node to the user.

Moreover, the cloak service request handler process may include receiving, by a cloak request handler, a read request identifying data to be read and containing encrypted authentication data from the cloak client of a Hadoop cluster edge node, passing, by the cloak request handler, the encrypted authentication information to a cloak authenticator, decrypting, by the cloak authenticator, the encrypted authentication information to reveal an identity of the user, and communicating, by the cloak authenticator, an identity of the user to a cloak authorizer to determine whether the user is authorized for the read request. The process may also include directing, by the cloak authorizer, the cloak reader to call a cloak key manager of a key management server in response to the user being authorized, wherein the call requests that a correct key for reading the requested data be provided.

The cloak storage format data retrieval method may still further include accessing, by the cloak key manager, a cloak secure key database, retrieving, by the cloak key manager, a key from the cloak key secure database, and returning, by the cloak key manager, the key along a decryption key request pathway to a cloak reader. Moreover, the method may include decrypting, by the cloak reader, the data in response to the key. In various embodiments, the cloak storage format data retrieval method also includes passing, by the cloak reader, the decrypted data to the cloak client of the Hadoop cluster edge node, and delivering, by the Hadoop cluster edge node, the decrypted data to the user.

A cloak service request handler process is disclosed whereby encrypted data may be decrypted. The process may include receiving, by a cloak request handler, a read request identifying data to be read and containing encrypted authentication data from a cloak client of a Hadoop cluster edge node, passing, by the cloak request handler, the encrypted authentication information to a cloak authenticator, decrypting, by the cloak authenticator, the encrypted authentication information to reveal an identity of a user, and communicating, by the cloak authenticator, an identity of the user to a cloak authorizer to determine whether the user is authorized for the read request. The process may include directing, by the cloak authorizer, the cloak reader to call a cloak key manager of a key management server in response to the user being authorized, wherein the call requests that a correct key for reading the requested data be provided.

The cloak service request handler process may further include accessing, by the cloak key manager, a cloak secure key database, and retrieving, by the cloak key manager, a key from the cloak key secure database.

The cloak service request handler process may also include returning, by the cloak key manager, the key along a decryption key request pathway to a cloak reader, and decrypting, by the cloak reader, the data in response to the key. The process may contemplate passing, by the cloak reader, the decrypted data to the cloak client of the Hadoop cluster edge node. Furthermore, the process may include delivering, by the Hadoop cluster edge node, the decrypted data to the user.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. Moreover, and as used herein, the terminology "passing" as in "passing" data includes in various embodiments transmitting the data, such as between components, and/or also includes writing the data to a known memory location such as on a Hadoop cluster, and/or otherwise storing the data in an accessible location.

Figure 1:
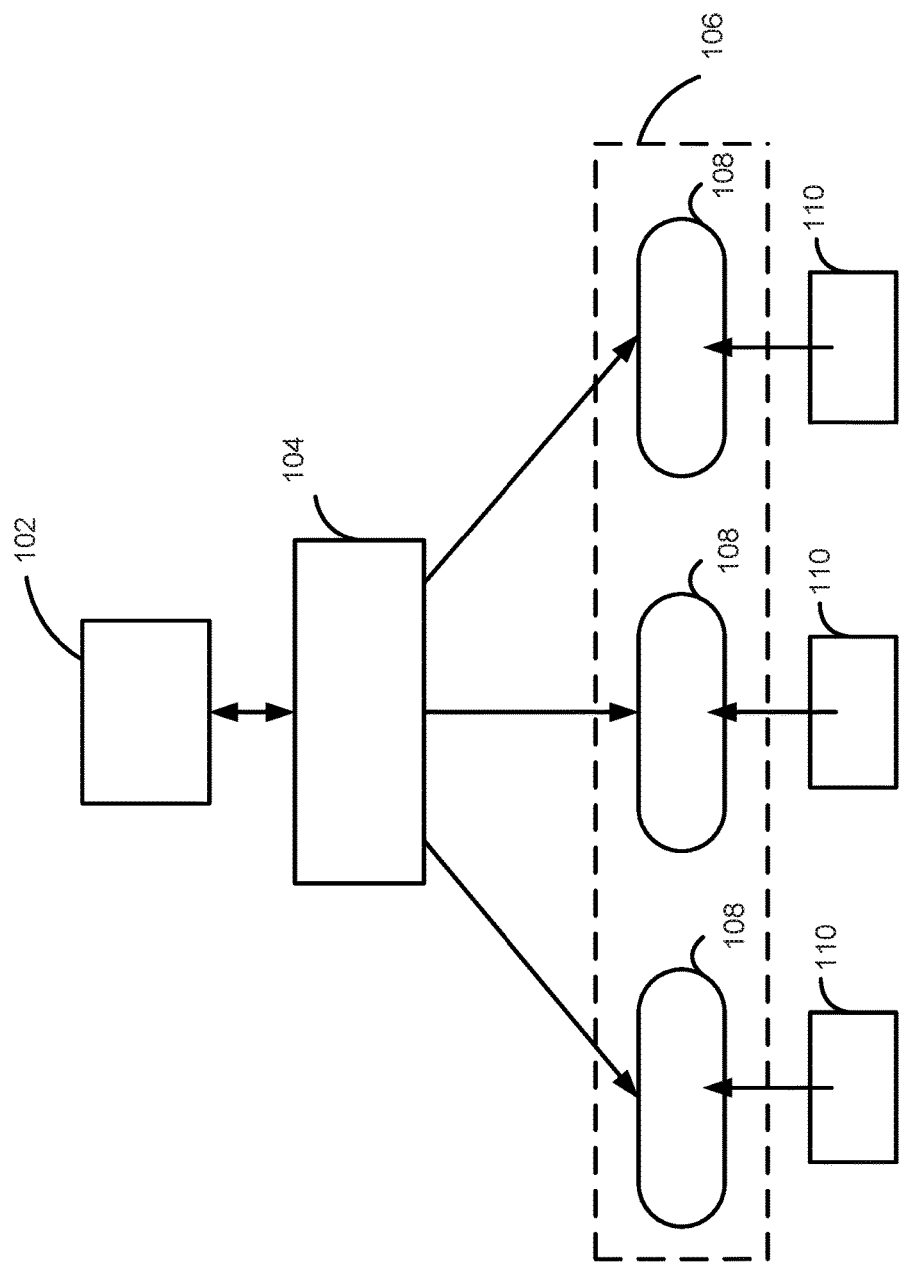
FIG. 1 illustrates an exemplary system for distributed storage and distributed processing, in accordance with various embodiments.

With reference to FIG. 1, system 100 for distributed data storage and processing is shown, in accordance with various embodiments. System 100 may comprise a host 102. Host 102 may comprise any device capable of receiving and displaying an electronic message via network 104. For example, host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, host 102 may interact with distributed storage system 106 for storage and/or processing of big data sets or other data sets suitable for recursive metadata creation and analysis. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to host 102. Nodes 108 may be distributed geographically in different locations, housed in the same building, and/or housed in the same rack. Nodes 108 may also be configured to function in concert to provide storage space and/or processing power greater than one of a node 108 might provide alone. As a result, distributed storage system 106 may collect and/or store the data 110. Data 110 may be collected by nodes 108 individually and compiled or in concert and collated. Data 110 may further be compiled into a data set and formatted for use in system 200 of FIG. 2.

In various embodiments, data 110 may comprise a collection of data including and/or originating from customer information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself as well as the data stored in the structure.

Figure 2:
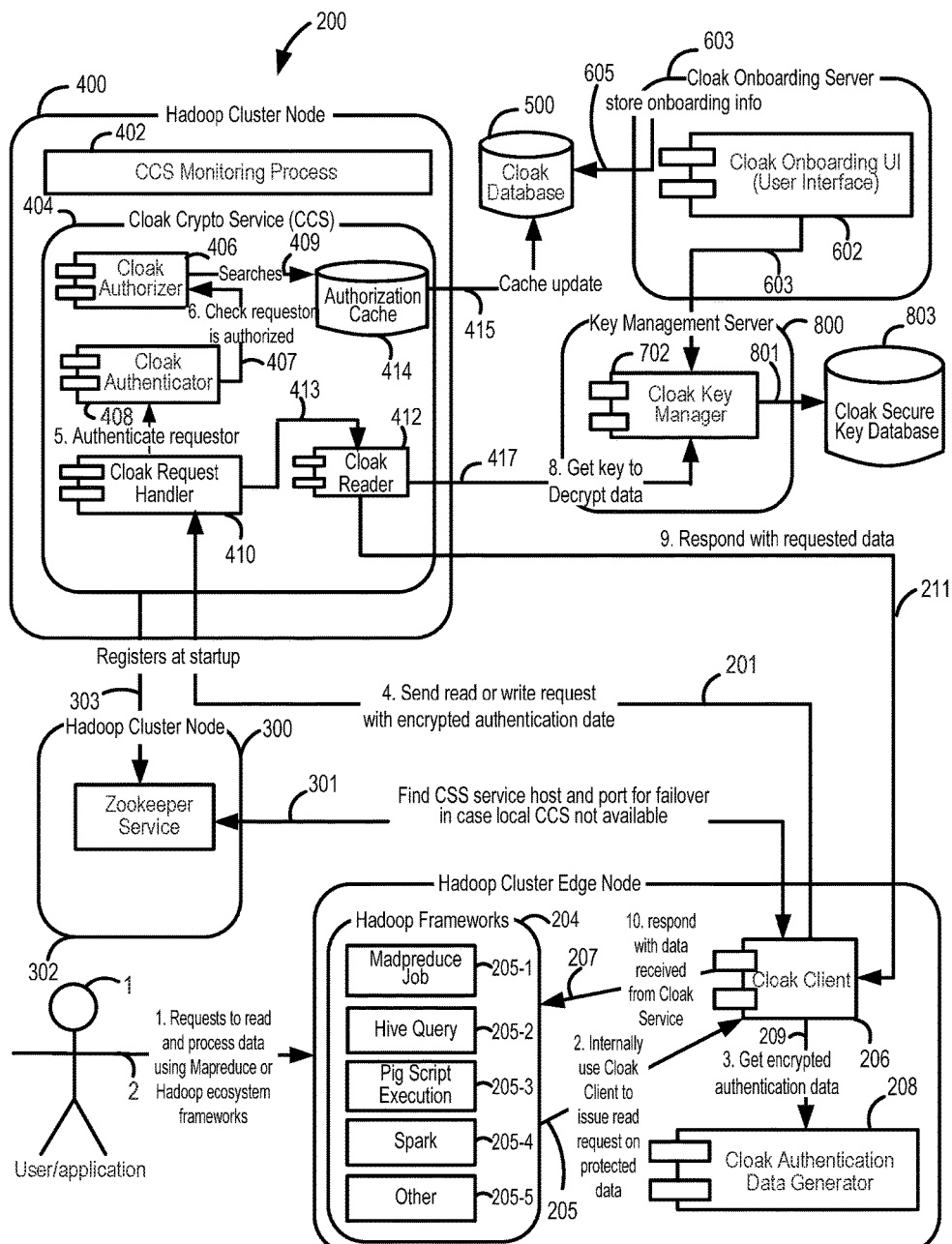
FIG. 2 illustrates an exemplary system for big data security, in accordance with various embodiments.

In various embodiments, and with reference to FIG. 2, system 200 is an exemplary solution for storing, accessing, and securing data on system 100 of FIG. 1. System 200 may comprise a cluster edge node 202. A cluster edge node 202 may perform various operations and processes, such as in accordance with methods disclosed herein. A cluster edge node 202 may include a sequence of shell commands for execution on a host (e.g., host 102 of FIG. 1) to interact with distributed storage system 106. In various embodiments, the cluster edge node 202 may comprise an edge component whereby a user 1 may interact with the system 200 and send and receive data therefrom. For instance, a cluster edge node 202 may receive requests to read and process data using Hadoop frameworks 204 from a user 1 via a user I/O pathway 2 and may interoperate with a Hadoop zookeeper cluster node 300 via an architecture determination pathway 301 and a Hadoop cluster node 400 via various pathways, such as an encrypted data request pathway 201 and a decrypted data reply pathway 211.

System 200 may comprise a Hadoop zookeeper cluster node 300. Hadoop zookeeper cluster node 300 may perform various operations and processes, such as in accordance with the methods disclosed herein. Hadoop zookeeper cluster node 300 may comprise a node whereby the addresses and roles of nodes may be determined and communicated to various nodes desiring to transact with one another. As such, the Hadoop zookeeper cluster node 300 may comprise a zookeeper service 302. The zookeeper service 30 may communicate with a cloak client 206 of a cluster edge node 202, such as so the cluster edge node 202 may find a cloak cryptography service 404 host and port for failover in case that a local cloak cryptography service 404 is not available. In other words, the zookeeper service 30 may direct various nodes (such as according to FIG. 1) to interoperate and intercommunicate with each other. Such communication may occur via an architecture determination pathway 301. Moreover, the zookeeper service 302 may communicate with a Hadoop cluster node 400 and more specifically a cloak cryptography service 404 of a Hadoop cluster node 400. For instance, the cloak cryptography service 404 may register with the zookeeper service 302 at startup, such as to enable itself to be addressed by other system components (e.g., nodes according to FIG. 1) with assistance of the Hadoop zookeeper cluster node 300.

System 200 may comprise a Hadoop cluster node 400. A Hadoop cluster node 400 may perform various operations and processes, such as in accordance with the methods disclosed herein. Hadoop cluster node 400 may receive requests to provide various data to users 1, and may selectively cause to be decrypted various data and forward it to the cluster edge node 202 for delivery to the user 1, in accordance with the access privileges of the user 1.

System 200 may comprise a cloak database 500. A cloak database 500 may comprise a mapping table whereby access privileges are ascribed to each user. Moreover, system 200 may comprise a cloak secure key database 803. A cloak secure key database 803 may comprise a mapping table, whereby decryption keys are catalogued according to the column and/or row of data from the cloak database 500 that each key decrypts and/or encrypts. Thus, the cloak secure key database 803 may comprise keys to decrypt data for delivery to a user possessing proper access privileges to access that specific data, according to cloak database 500.

System 200 may comprise a cloak onboarding server 600. A cloak onboarding server 600 may receive data from a data source (such as a user 1) for storage by the system 200, such as in a cloak database 500 and/or cloak secure key database 803.

System 200 may comprise a key management server 700. A key management server 700 may store and retrieve encryption/decryption keys from a cloak secure key database 803 in response to communication with a cloak onboarding server 600 and/or a Hadoop cluster node 400, performing various operations and processes, such as in accordance with the methods disclosed herein.

Turning in greater detail to cluster edge node 202, cluster edge node 202 may comprise Hadoop frameworks 204. In more specific detail, the cluster edge node 202 may include commands for interacting with a HIVE via a command line interface. Cluster edge node 202 may thus include Hadoop frameworks 204 that request actions from an underlying Hadoop system (i.e., distributed storage system 106 in FIG. 1 may be configured to store and/or access data using the Hadoop framework 204) or another suitable big data storage framework. For example, Hadoop frameworks 204 may include a first framework 205-1, a second framework 205-2, a third framework 205-3, a fourth framework 205-5, and a fifth framework 205-5 and/or any number of frameworks. In various embodiments, first framework 205-1 comprises a mapreduce job, second framework 205-2 comprises a Hive query, third framework 205-3 comprises a Pig script execution, fourth framework 205-4 comprises Spark, and/or fifth framework 205-5 comprises other Hadoop framework(s). As such, cluster edge node 202 may comprise a Hadoop cluster edge node 202.

Cluster edge node 202 may comprise a cloak client 206. A cloak client 206 may comprise a buffer mechanism whereby the system 200 and/or system 100 are protected from malicious actions such as by a user 1. For instance, a cloak client 206 may comprise a mechanism whereby, in response to user requests, read request of protected data from a cloak database 500 may be transceived. For instance, the cloak client 206 may request data from a cloak database 500 in response to a command received from a Hadoop framework 204 via a read request pathway 205. The cloak client 206 may communicate variously with the Hadoop zookeeper cluster node 300 such as to determine address information of other system components, for instance, a Hadoop cluster node 400. The cloak client 206 may communicate with the Hadoop cluster node 400, via a cluster node read/write request with encrypted data request pathway 201. The cloak client 206 may communicate with a cloak authentication data generator 208, whereby the cloak client 206 may obtain encrypted authentication information for the user 1, whereby the user may be uniquely identified to the system 200, such as to determine access permissions for the user before granting that user access to the data the user desires to access.

The cluster edge node 202 may comprise a cloak authentication data generator 208. The cloak authentication data generator 208 may generate encrypted credentials corresponding to the identity of the user 1, such as to uniquely characterize the access permissions for the user.

Turning in greater detail to the Hadoop cluster node 400, the Hadoop cluster node 400 may comprise a cloak cryptography service (CCS) monitoring process 402. A CCS monitoring process 402 may comprise a service whereby a CCS 404 may be controlled by the system 200. The Hadoop cluster node 400 may comprise a cloak cryptography service (CCS) 404 whereby data may be selectively retrieved and/or decrypted according to a decryption key and user authentication credentials, and whereby data may be provided to a cluster edge node 202 for delivery to a user 1.

More specifically, a cloak cryptography service 404 may comprise various components. For instance, a cloak cryptography service 404 may comprise a cloak request handler 410. The cloak request handler 410 may receive a request to read or write data to the cloak database 500 and/or cloak secure key database 803 from the cloak client 206 of the cluster edge node 202. The cloak request handler 410 may receive such a request and/or encrypted authentication data identifying the user 1 via an encrypted data request pathway 201 and may communicate with a cloak authenticator 408 via a requestor authentication pathway 405 and with a cloak reader 412 via a cloak read request pathway 413. The cloak request handler 410 may direct various aspects of the Hadoop cluster node 400 to perform operations and methods in response to the request and/or encrypted authentication data identifying the user 1. For example, the cloak request handler 410 may pass the encrypted authentication data identifying the user 1 to a cloak authenticator 408 via a requestor authentication pathway 405 whereby the identity of the user 1 is determined in response to the encrypted authentication data. The cloak request handler 410 may pass the request to a cloak reader 412 via a cloak read request pathway 413 such as to read/write data to the cloak database 500 and/or cloak secure key database 803 in response to the request.

The cloak cryptography service 404 may comprise a cloak authenticator 408. The cloak authenticator 408 may evaluate the encrypted authentication data received along encrypted data request pathway 201 corresponding to user 1 and identify the user 1 to the cloak request handler 410.

The cloak cryptography service 404 may comprise a cloak authorizer 406. The cloak authorizer 406 may, in response to the identification of the user 1 to the cloak request handler 410, evaluate the specific data request from the user 1, and determine whether that user 1 is authorized to access that specific data. Thus, the cloak authorizer 406 may communicate with the cloak request handler 410 via a Requestor Authorization Pathway 407.

The cloak cryptography service 404 may comprise a cloak reader 412. The cloak reader 412 may communicate via a decryption key request pathway 417 with a cloak key manager 702 of a key management server 800. The cloak reader 412 may obtain the key to decrypt data sought to be retrieved from a cloak database 500 by the user. The cloak reader 412 may pass this key to the cloak request handler 410 which, in communication with the cloak authorizer 406 retrieves the data to which the key corresponds via an authorization search pathway 409 from an authorization cache 414. In this manner, the cloak reader 412 may first retrieve requested data, then may communicate to the cloak client 206 of a cluster edge node 202 and provide the requested data via an encrypted data request pathway 201.

As briefly mentioned, the cloak cryptography service 404 may comprise an authorization cache 414. The authorization cache 414 may be interconnected to the cloak authorizer 406 via an authorization search pathway 409 and to a cloak database 500 via a cache update pathway 415. The authorization cache 414 may comprise a local (e.g., within the Hadoop cluster node 400) cache of data, such as recently and/or frequently accessed data of the cloak database 500. In this manner, data may be retrieved more rapidly and with more efficient use of distributed resources, such as according to FIG. 1.

With reference to the previous discussion of the cloak onboarding server 600, a cloak onboarding server 600 may comprise a cloak onboarding user interface 602. A cloak onboarding user interface 602 may comprise an electronic interface whereby a user, such as a user 1 may cause data to be stored into the cloak database 500 and the cloak secure key database 803 for later retrieval. The cloak onboarding user interface 602 may be connected by a cloak onboarding information management pathway 605 to a cloak database 500 whereby data may be transmitted to the cloak database 500 for storage. The cloak onboarding user interface 602 may be connected by a cloak onboarding key management pathway 603 to the cloak key manager 702 of the key management server 800. Keys may be identified to correspond to data being stored in cloak database 500 and may be used to encrypt this data, and be associated with this data and stored by the cloak key manager 702 into the cloak secure key database 803 via a key retrieval pathway 801.

The disclosed systems and methods enable a user to view and/or analyze big data sets. For instance, the systems and methods may enable the granular (e.g., cell by cell) encryption, decryption, retrieval, and/or storage of data into rows and columns of a cloak database 500, where the data may be encrypted at rest, according to a variety of corresponding keys stored in a cloak secure key database 803. In that regard, the big data set may be readily viewed and understood be a user that otherwise may not be able to meaningfully view.

Figure 3:
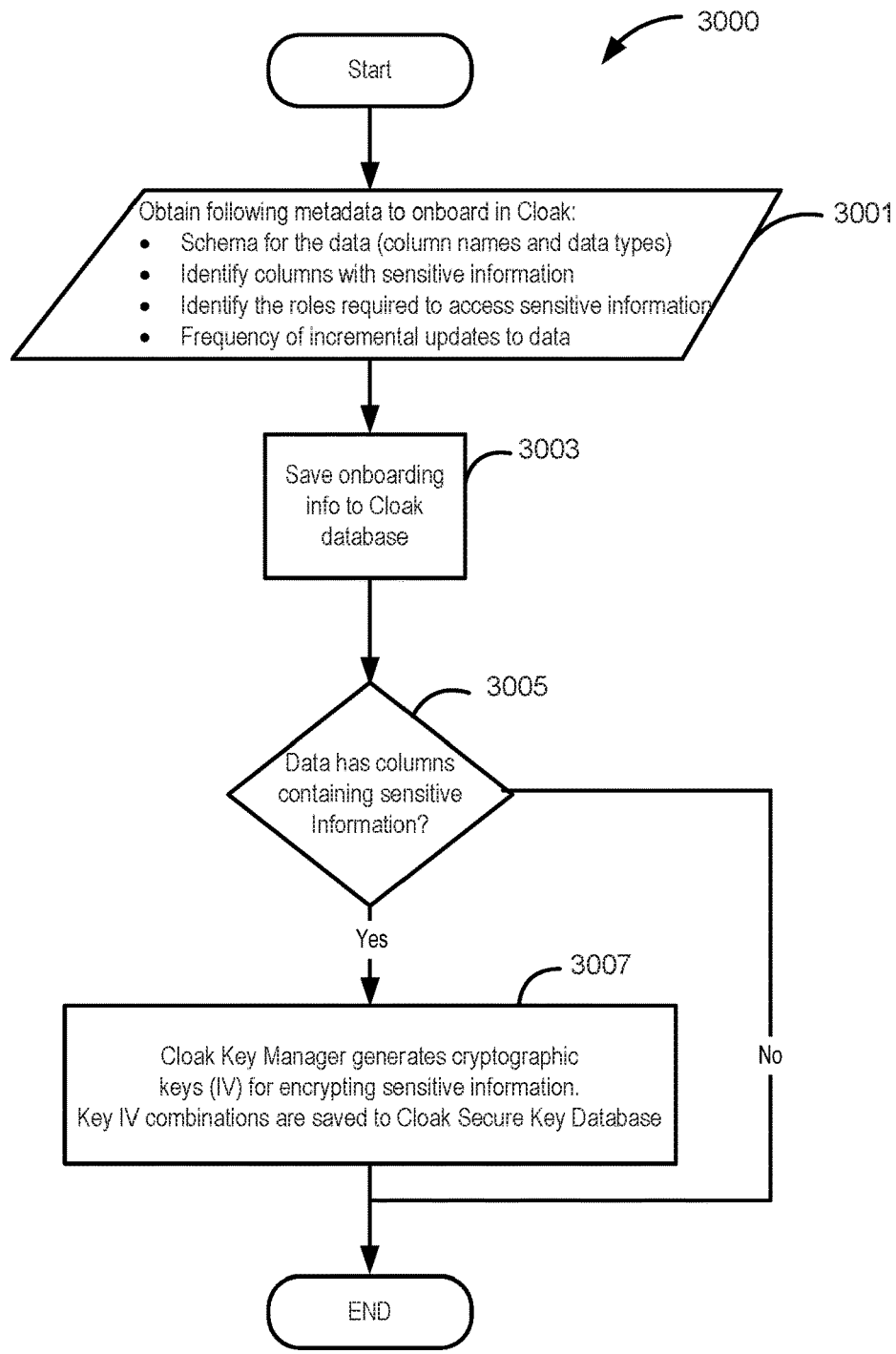
FIG. 3 illustrates an exemplary method of cloaked data onboarding, in accordance with various embodiments.

With regard to FIGS. 1 and 2, and with additional particular attention to FIG. 3, a method of cloaked data onboarding 3000 is presented. A cloaked method of data onboarding 3000 may comprise a method of obtaining from a user 1 by a cloak onboarding server 600, data desired to be stored in a cloak database 500, and encrypting that data and securing that data in the cloak database 500 with corresponding encryption keys stored in cloak secure key database 803. For example, the system 200 may obtain metadata associated with data to be onboarded (Step 3001). For example, the user may enter metadata via the cloak onboarding user interface 602 of the cloak onboarding server 600. The metadata may comprise schema for the data (e.g., column names and data types). The metadata may comprise identification of columns to contain sensitive information, such as personally identifiable information, credit card numbers, and the like. Moreover the metadata may comprise an identification of the types of users (e.g., "roles") necessary to be permitted access to the data. Moreover, the metadata may comprise an identification of the frequency of updates to the data.

The system 200 may store that metadata associated with data to be onboarded, the metadata being transmitted to the cloak database 500 by the cloak onboarding user interface 602 along cloak onboarding information management pathway 605 (Step 3003).

The cloak onboarding server 600 may, in response to the metadata, determine whether data being onboarded has columns containing sensitive information (Step 3005). In response to sensitive information being contained, the cloak onboarding user interface 602 may instruct the cloak key manager 702 of the key management server 800, via cloak onboarding key management pathway 603 to generate cryptographic keys and/or initialization vectors for encrypting the data. The cloak key manager 702 may store the cryptographic keys and/or initialization vectors in cloak secure key database 803 via a key retrieval pathway 801 (Step 3007). In this manner, both encrypted and clear text data may be stored in the cloak database 500, with granular access privileges identified via metadata, and with the encrypted data in an encrypted state at rest.

Figure 4:
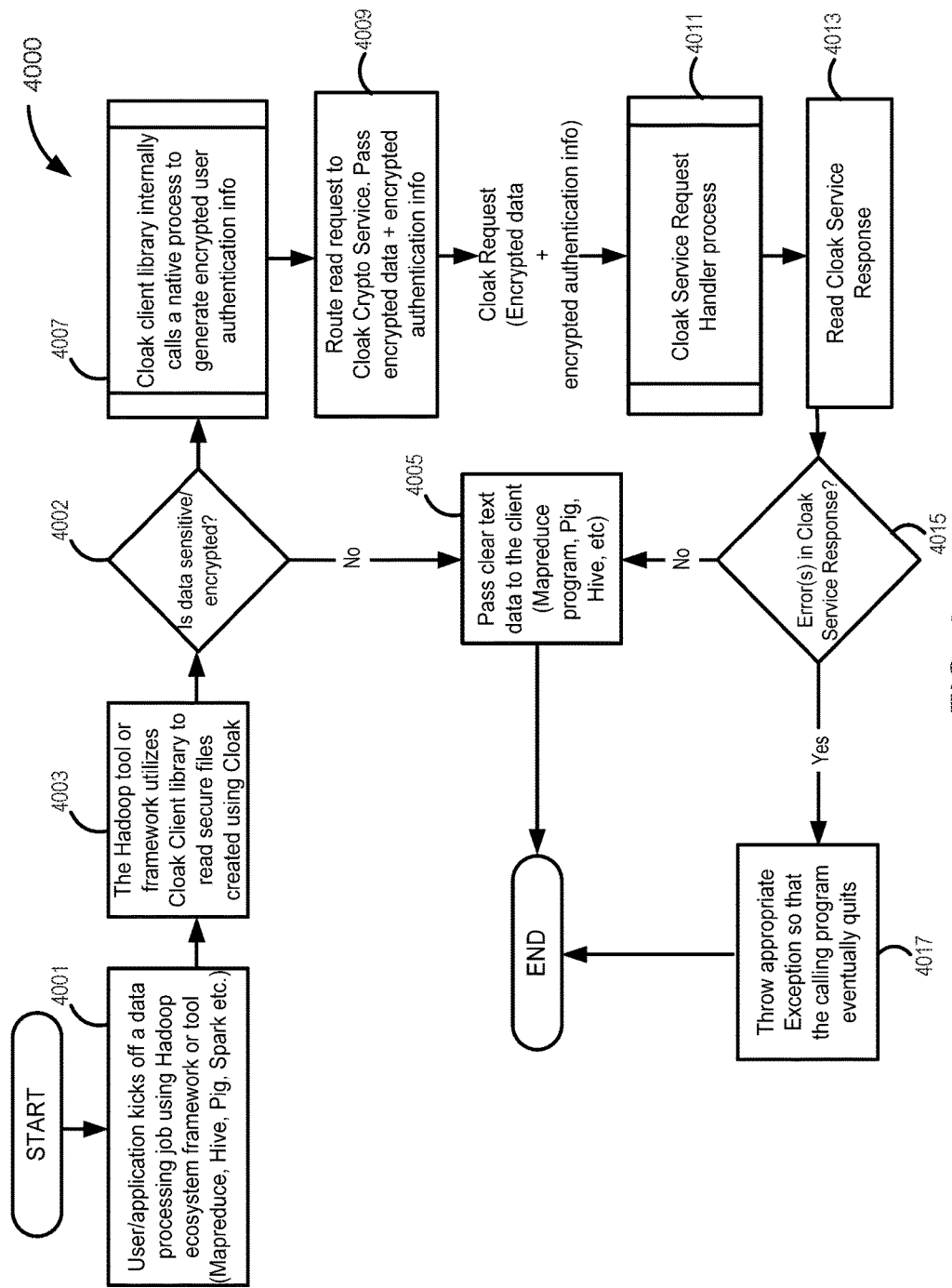
FIG. 4 illustrates an exemplary cloak storage format data retrieval method, in accordance with various embodiments.

With regard to FIGS. 1-3, and with additional particular attention to FIG. 4, in various embodiments, data stored in the cloak database 500 may be retrieved according to a cloak storage format data retrieval method 4000. The method may comprise various steps. For instance, a user 1 may request via a user I/O pathway 2 to read and process data. More specifically, a user 1 may submit a request to the Hadoop cluster edge node 202 via a Hadoop framework 204 through communication along the user I/O pathway (Step 4001). The Hadoop framework 204 may direct the cloak client 206 to read encrypted data stored in a cloak database 500 (Step 4003). In response (Step 4002) to the data being unencrypted, the Hadoop cluster node 400 may retrieve and pass the unencrypted data to the cloak client 206 of the Hadoop cluster edge node 202 for delivery to a user 1 (Step 4005).

In response to the data being encrypted (Step 4002), the cloak client 206 calls the cloak authentication data generator 208 via an encrypted authentication data pathway 209 to generate encrypted user authentication information whereby the user 1 may be identified (Step 4007). A read request identifying the data to be read, and containing the encrypted authentication data, is routed from the cloak client 206 of the Hadoop cluster edge node 202 to the cloak request handler 410 of a cloak cryptography service 404 running under the supervision of a cloak cryptography service monitoring process 402 in a Hadoop cluster node 400 (Step 4009). The cloak cryptography service 404 may run a cloak service request handler process 5000 discussed with reference to FIG. 5 (Step 4011). The cloak cryptography service 404 may respond with the requested data via a decrypted data reply pathway 211 to the cloak client 206 of the Hadoop cluster edge node 202 (Step 4013). The cloak client 206 evaluates the response for errors (Step 4015). If errors are found, an exception is thrown so that the process concludes (Step 4017). If errors are not found, the unencrypted data may be delivered by the Hadoop cluster edge node 202 to a user 1 (Step 4005).

Figure 5:
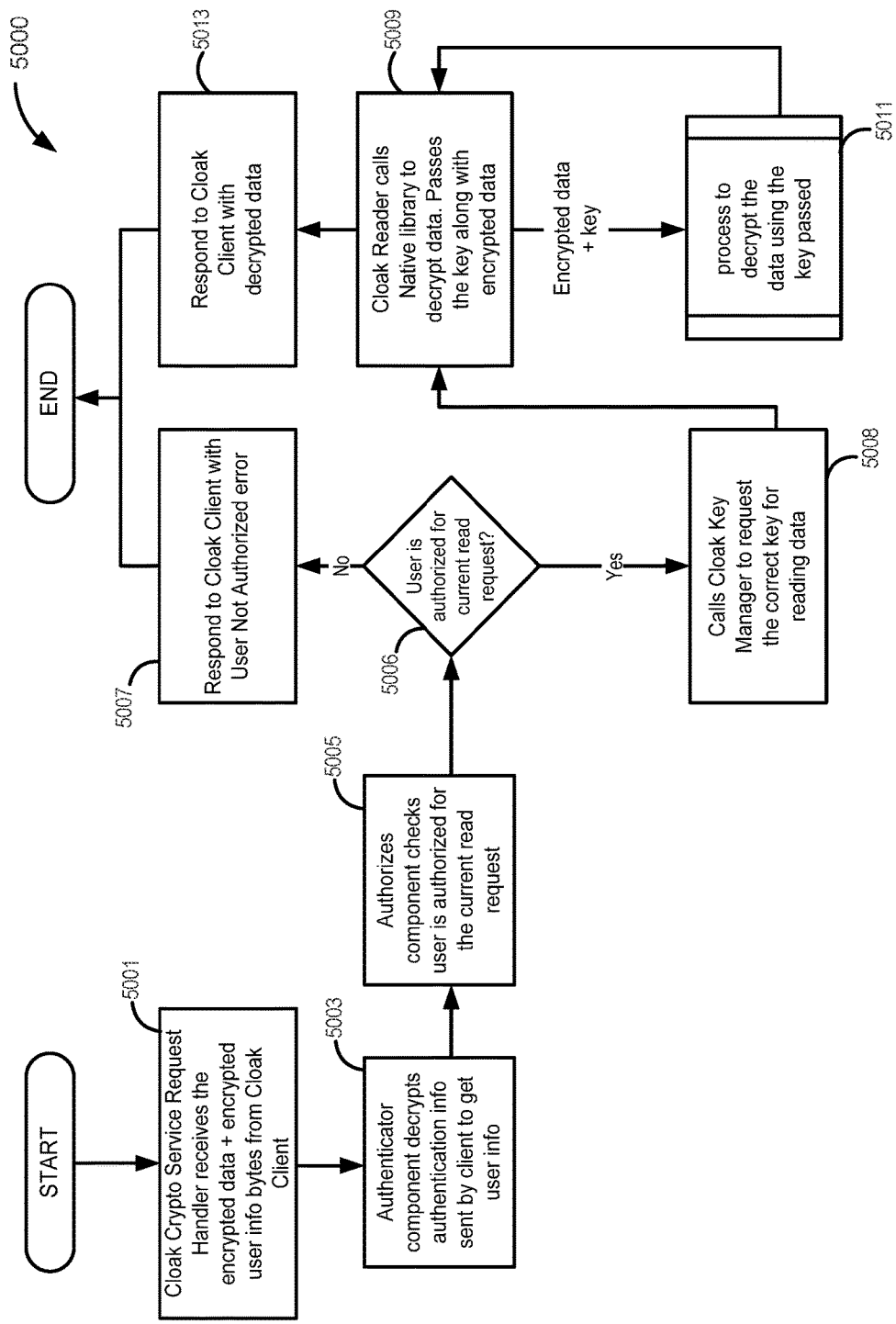
FIG. 5 illustrates an exemplary cloak service request handler process, in accordance with various embodiments.

With regard to FIGS. 1-4, and with additional particular attention to FIG. 5, a cloak service request handler process 5000 may comprise various steps whereby data stored encrypted at rest may be accessed, and decrypted, and provided to a user having proper credentials to access the data. For example, the cloak request handler 410 may receive a read request identifying the data to be read and containing the encrypted authentication data from the cloak client 206 of the Hadoop cluster edge node 202 (Step 5001). The cloak request handler 410 may pass the encrypted authentication information to a cloak authenticator 408 via a requestor authentication pathway 405 and the cloak authenticator 408 may decrypt the authentication information to reveal the identity of the user 1 (Step 5003).

The cloak authenticator 408 may communicate this identity to a cloak authorizer 406 which determines whether the user is authorized for the read request (Step 5005). In response to the user being not authorized (Step 5006), the cloak authorizer 406 returns a response indicating that the user is unauthorized and access will not be provided (Step 5007). In response to the user being authorized (Step 5006), the cloak authorizer 406 directs the cloak reader 412 to call a cloak key manager 702 of a key management server 800 requesting that the correct key for reading the requested data be provided via a decryption key request pathway 417 (Step 5008). The cloak key manager 702 accesses the cloak secure key database 803, retrieves the key, and returns it along the decryption key request pathway 417 (Step 5009) As such, the key and the encrypted data are now available to the cloak reader 412, which calls a native library to decrypt the data (Step 5011). Following the decryption of the data, the cloak reader 412 passes the decrypted data to the cloak client 206 of the Hadoop cluster edge node 202, whereby it may be delivered to a user 1 (Step 5013).

Thus, one may appreciate that data may be encrypted at rest and user access to the encrypted data may be controlled with granularity whereby different users may have different access permission row by row, column, by column, and even cell by cell to onboarded data stored in the cloak database 500.

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cloaked data system comprising:
    a cloak database comprising a table of data and metadata comprising a schema of the table of data;
    a cluster edge node comprising a Hadoop framework, wherein the cluster edge node allows access to at least a portion of the table of data;
    a Hadoop cluster node configured to selectively decrypt the at least a portion of the table of data;
        wherein the Hadoop cluster node comprises a cloak cryptography service such that the at least a portion of the table of data may be selectively retrieved and decrypted, and
        wherein the cloak cryptography service comprises: a cloak request handler, a cloak authenticator, a cloak reader, and a cloak authorizer; and
    a cloak key database comprising an encryption key corresponding to the table of data.

2. The cloaked data system of claim 1, wherein the schema comprises:
    a number of columns of a table;
    a data type of the data; and
    a user role associated with at least one of a row, column, and cell of the table.

3. The cloaked data system of claim 1, further comprising a key management server configured to store and retrieve the encryption key from the cloak key database, in response to a request of the Hadoop cluster node.

4. The cloaked data system according to claim 1, wherein the cluster edge node comprises:
    a cloak client configured to, in response to a user request received from the Hadoop framework via a read request pathway, transmit at least one of a read or write request of the at least a portion of the table of data from the cloak database; and
    a cloak authentication data generator configured to generate encrypted authentication information corresponding to a user identity of the user and a role of the user.

5. The cloaked data system of claim 1, wherein the cluster edge node is configured to receive a user request from a user.

6. The cloaked data system of claim 1, wherein, in response to a user request, the Hadoop cluster node selectively decrypts the at least a portion of the table of data.

7. The cloaked data system according to claim 1, wherein the cloak reader is in logical communication with a cloak key manager of a key management server via a decryption key request pathway, and wherein the cloak reader obtains a key to decrypt the at least a portion of the data of the table.

8. The cloaked data system of claim 1, wherein the at least a portion of the table of data is selectively retrieved and decrypted according to a decryption key, a user identity, and a user role.

9. The cloaked data system of claim 1, wherein the cloak request handler is configured to receive a request from a cloak client of a cluster edge node via a requestor authentication pathway to read or write data to at least one of the cloak database or the cloak key database.

10. The cloaked data system of claim 1, wherein the cloak authenticator is configured to receive encrypted authentication data from a cloak request handler via the requestor authentication pathway, wherein a user identity and a user role may be determined in response to the encrypted authentication data.

11. The cloaked data system of claim 1, wherein the cloak reader is configured to receive a read request from a cloak client of the cluster edge node via a cloak read request pathway.

12. The cloaked data system of claim 1, wherein the cloak authorizer is in logical communication with the cloak request handler via a requestor authorization pathway, and wherein the cloak authorizer is configured to determine whether a user is authorized for the read request.

13. A method comprising:
receiving, by a cloak request handler and from a cloak client of a Hadoop cluster edge node, a read request identifying data to be read,
wherein the read request contains encrypted authentication data from the cloak client of a Hadoop cluster edge node;
decrypting, by a cloak authenticator, the encrypted authentication information to reveal an identity of the user;
communicating, by the cloak authenticator, the identity of the user to a cloak authorizer to determine whether the user is authorized for the read request; and
requesting, by the cloak authorizer, that a correct key for reading the requested data be provided; and
responding, by the cloak cryptography service, with the decrypted data, to the cloak client of the Hadoop cluster edge node.

14. The method of claim 13, further comprising:
receiving, by the Hadoop cluster edge node, a request from a user via a Hadoop framework;
directing, by the Hadoop framework, the cloak client to read encrypted data stored in a cloak database in response to the request; and
generating, by the cloak client, encrypted user authentication information.

15. The method of claim 13, wherein:
the cloak request handler is configured to obtain data to be read,
the cloak request handler comprises a component of a cloak cryptography service running under supervision of a cloak cryptography service monitoring process in the Hadoop cluster edge node,
the read request identifies the data to be read and contains encrypted user authentication information, and
the cloak reader calls a cloak key manager of a key management server, in response to the user being authorized.

16. The method of claim 13, further comprising:
evaluating, by the cloak client, the response for errors; and
delivering, in response to errors not being found, unencrypted data by the Hadoop cluster edge node to the user.

17. The method of claim 13, further comprising:
accessing, by the cloak key manager, a cloak secure key database;
retrieving, by the cloak key manager, a key from the cloak key secure database;
returning, by the cloak key manager, the key along a decryption key request pathway to a cloak reader;
decrypting, by the cloak reader, the data in response to the key;
passing, by the cloak reader, the decrypted data to the cloak client of the Hadoop cluster edge node; and
delivering, by the Hadoop cluster edge node, the decrypted data to the user.

18. A method, comprising:
determining, by the cloak authorizer, whether the user is authorized for a read request based on the identity of the user,
wherein the read request contains encrypted authentication information from a cloak client of a Hadoop cluster edge node; and
directing, by the cloak authorizer, the cloak reader to call a cloak key manager of a key management server, in response to the user being authorized,
wherein the call requests that a correct key for reading the requested data be provided.

19. The method of claim 18, further comprising:
accessing, by the cloak key manager, a cloak secure key database; and
retrieving, by the cloak key manager, a key from the cloak key secure database.

20. The method claim 18, further comprising:
returning, by the cloak key manager, the key along a decryption key request pathway to a cloak reader; and
decrypting, by the cloak reader, the data in response to the key.

* * * * *